(12) United States Patent
Zhan et al.

(10) Patent No.: US 10,890,687 B2
(45) Date of Patent: Jan. 12, 2021

(54) METHOD AND SYSTEM FOR MEASURING FORMATION RESISTIVITY

(71) Applicant: China Petroleum & Chemical Corporation, Beijing (CN)

(72) Inventors: Sheng Zhan, Houston, TX (US); Jinzhou Yang, Shandong (CN); Jinhai Zhao, Houston, TX (US); Laiju Han, Shandong (CN); Weiping Xu, Houston, TX (US); Hongbing Xiao, Shandong (CN); Herong Zheng, Houston, TX (US); Zhen Yang, Shandong (CN)

(73) Assignee: China Petroleum & Chemical Corporation, Beijing (CN)

(*) Notice: Subject to any disclaimer, the term of this patent is extended or adjusted under 35 U.S.C. 154(b) by 0 days.

(21) Appl. No.: 16/454,941

(22) Filed: Jun. 27, 2019

(65) Prior Publication Data
US 2019/0317242 A1 Oct. 17, 2019

Related U.S. Application Data

(62) Division of application No. 15/941,986, filed on Mar. 30, 2018, now Pat. No. 10,365,401, which is a division of application No. 15/048,088, filed on Feb. 19, 2016, now Pat. No. 10,520,639.

(51) Int. Cl.
*G01V 11/00* (2006.01)
*E21B 47/026* (2006.01)

(52) U.S. Cl.
CPC .......... *G01V 11/00* (2013.01); *E21B 47/026* (2013.01)

(58) Field of Classification Search
CPC .......... G01V 11/002; G01V 3/28; G01V 3/30; E21B 44/00; E21B 47/024; E21B 47/122; E21B 47/01; E21B 4/00; E21B 10/00; E21B 17/04; E21B 7/04; E21B 47/0905; E21B 4/02; E21B 7/068; E21B 17/028
See application file for complete search history.

(56) References Cited

U.S. PATENT DOCUMENTS

| | | |
|---|---|---|
| 4,754,645 A | 7/1988 | Piche et al. |
| 5,869,968 A | 2/1999 | Brooks et al. |
| 2013/0319764 A1 | 12/2013 | Schaaf et al. |
| 2014/0097026 A1 | 4/2014 | Clark et al. |
| 2014/0332272 A1 | 11/2014 | Gawski et al. |
| 2015/0355368 A1 | 12/2015 | Li et al. |
| 2017/0045641 A1* | 2/2017 | Agnihotri ............... E21B 47/00 |
| 2017/0167244 A1* | 6/2017 | Beckman ............ E21B 47/0006 |

* cited by examiner

*Primary Examiner* — Mouloucoulaye Inoussa
(74) *Attorney, Agent, or Firm* — Novick, Kim & Lee, PLLC; Allen Xue

(57) ABSTRACT

A downhole drilling system has a downhole motor, a universal-joint assembly having an upper universal joint and a lower universal and a connecting rod connecting the upper universal joint and the lower universal joint, and a measurement sub. The measurement sub is disposed about the connecting rod and the connecting rod extends through the measurement sub in a longitudinal direction thereof.

3 Claims, 10 Drawing Sheets

METHOD AND SYSTEM FOR MEASURING FORMATION RESISTIVITY

CROSS-REFERENCE TO RELATED APPLICATION

This application is a divisional application of U.S. application Ser. No. 15/941,986 filed on Mar. 30, 2018, which is a divisional application of U.S. application Ser. No. 15/048,088 filed on Feb. 19, 2016, the entire contents of which are incorporated herein by reference in their entirety.

TECHNICAL FIELD

The present disclosure relates to method and tools for directional drilling, particularly to a downhole tool that has a measurement sub for monitoring the environment near the drill bit and the method of operating thereof.

BACKGROUND

Logging-While-Drilling (LWD) instruments are widely used in oil and gas drilling and formation evaluation. They collect information such as formation resistivity, gamma ray, neutron porosity, borehole caliper, well inclination during the drilling process and transmit the real-time information to the surface. Such information is essential in real-time control of the bit so that the well trajectory closely follows the planned geometric trajectory and can also be adjusted in response to changes in the formation. However, since conventional LWD instruments are installed at some distance behind the drill bit, e.g., 10 meters or more, they cannot measure the conditions at the drill bit. Delays in obtaining the formation information results in delays in adjusting the bit orientation, which lowers drilling efficiency.

Directional drilling requires geological information at or close to the bit to effectively identify formation boundaries and steer the well trajectory in a way that maximizes its exposure in the pay zone. Near-bit measurement of resistivity, gamma ray, and well inclination, etc. become more important in this situation. However, to pack many LWD instruments near the bit can be challenging due to the limited space available near the drill bit. For example, in azimuthal resistivity measurement, in order to minimize the size of logging tool, guard electrodes are often omitted from the logging device so that a substantial portion of the electric current travels into the drilling mud. The measurement current, after flowing from the central electrode, quickly dissipates into the drilling fluid as well as the shoulder bed so that the vertical resolution of resistivity is very low and the resistivity measurement is greatly skewed by the borehole effects. On the other hand, some laterologging tools employ multiple pairs of monitor electrodes and guard electrodes in order to focus the measurement current. Nevertheless, more electrodes require more complex circuitry and lower the system reliability.

LWD instruments may be installed on the bent housing of the downhole drilling motor or between the bent housing and the drill collar below the bent housing. However, this would change the structure around the bend, which in turn affects the build angle and reduces the strength of the drilling tool. Such a drilling tool also needs to satisfy a certain well inclination. Although these problems may be alleviated by installing the resistivity logging tool between the downhole drill motor and the bent housing, the measurement is further away from the bit. Furthermore, directional drilling requires correlating resistivity with gamma rays and other azimuthal measurements to gather azimuthal resistivity and identify formation boundaries.

Accordingly, there is a need for tools and methods for measuring and transmitting information at or near the drill bit.

SUMMARY

This disclosure provides a near-bit directional drilling system and methods of operating thereof. In one embodiment, the system comprises a downhole drilling tool. The downhole drilling tool includes a downhole motor that has a rotor and a stator, a universal-joint assembly having an upper universal joint and a lower universal and a connecting rod connecting the upper universal joint and the lower universal joint. The downhole drilling tool also includes a drive shaft assembly having a drive shaft, a drill bit coupled to a distal end of the drive shaft, and a measurement sub. Furthermore, the distal end of the downhole motor is coupled to the upper universal-joint; the drive shaft assembly is coupled to the lower universal-joint, and the connecting rod extends through the measurement sub in a longitudinal direction of the measurement sub.

In another embodiment, the measurement sub includes a resistivity measurement tool for measuring a formation resistivity in a borehole, at least one gamma ray detector disposed on the surface of the measurement sub, at least one accelerometer for measuring the inclination of the borehole, at least one ultrasonic probe for measuring the caliper of the borehole, and a communication module for transmitting data through wired connection or wirelessly.

In a further embodiment, the resistivity measurement tool includes at least one transmitter coil, two or more receiver coils disposed about the surface of measurement sub. Among the axis of the transmitter coil, the axis of the first receiver coil, the axis the second receiver coil, and the longitudinal axis of the measurement sub, at least two are parallel or not parallel to each other.

In still another embodiment, the downhole drilling tool includes a circuitry having a microcontroller chip and a digital signal processor chip. The circuitry is coupled with the resistivity measurement tool, at least one gamma ray detector, at least one accelerometer, and at least one ultrasonic probe. The circuitry controls the operations of these instruments and processes data received therefrom.

This disclosure also provides a method of measuring a formation form a wellbore being drilled by a downhole drilling tool. The method includes providing a measurement sub on the downhole drilling tool, rotating the measurement sub with the downhole drilling tool, emitting electromagnetic waves at two or more frequencies using the transmitter installed on the measurement sub, and receiving azimuthal electromagnetic signals using the first and the second receivers installed on the measurement sub. The method further includes calculating a formation boundary information based on amplitude ratios and phase shifts between electromagnetic fields from two azimuthal sections having an 180° phase difference and obtaining an apparent resistivity based on amplitude ratios and/or phase shifts between electromagnetic signals received by the first receiver and by the second receiver.

In addition, this disclosure provides a method for measuring formation resistivity. The method includes obtaining an apparent resistivity using an induction logging tool having at least one transmitter for an electromagnetic signal and two receivers for the electromagnetic signal, adjusting the apparent resistivity for a downhole temperature effect, and adjusting the apparent resistivity for a borehole caliper effect.

BRIEF DESCRIPTION OF THE DRAWINGS

The teachings of the present invention can be readily understood by considering the following detailed description in conjunction with the accompanying drawings.

DETAILED DESCRIPTION

Figure 1:
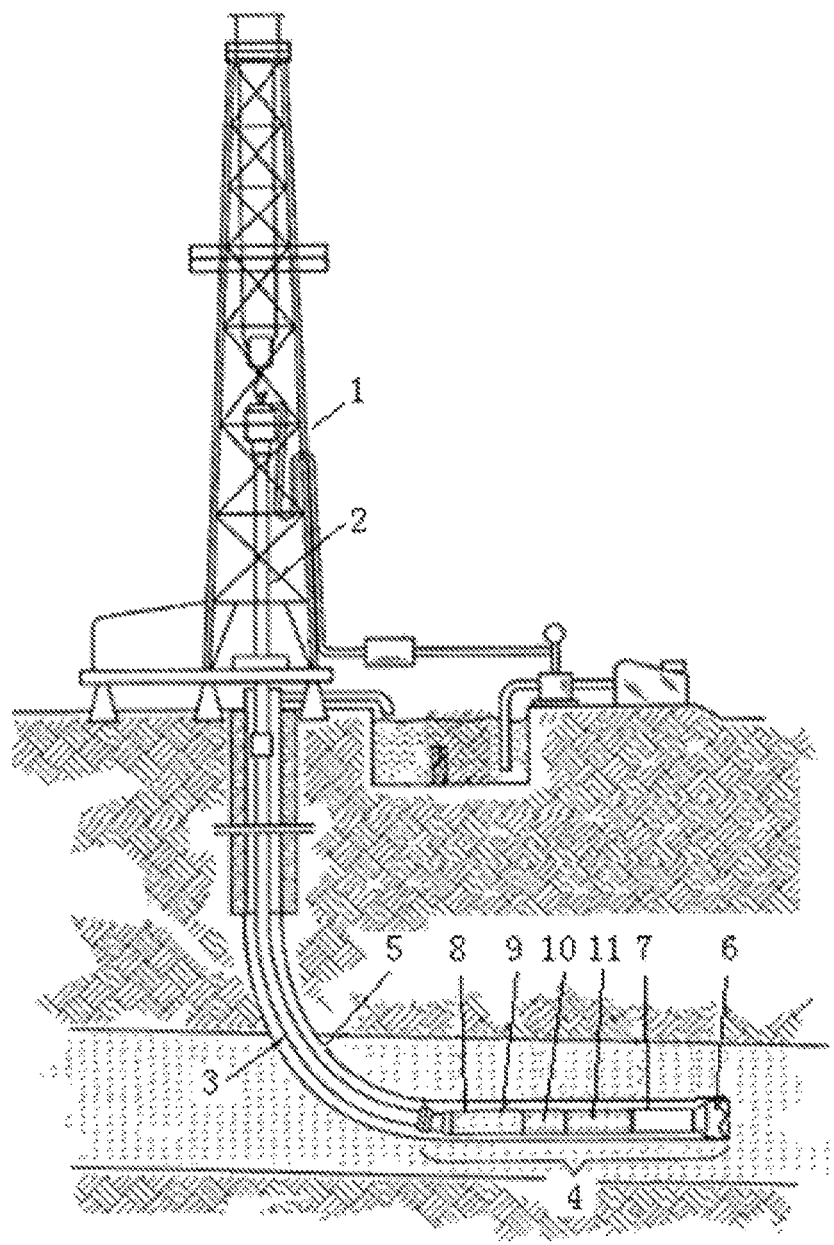
FIG. 1 is a schematic diagram showing one embodiment of the drilling system of the current disclosure.

Reference will now be made in detail to the embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the present disclosure.

FIG. 1 is a schematic diagram of a drilling system of the current disclosure, which employs one embodiment of the downhole drilling tool of the current disclosure. The drilling system 100 has a derrick 1 above the surface. A kelly 2 drives the drill string 3 into the borehole 5. The lower part of the drill string 3 is a bottomhole assembly (BHA) 4, which includes the non-magnetic drill collar 8 with a MWD system 9 installed therein, the LWD instruments 10, the downhole motor 11, the near-bit measurement sub 7, the drill bit 6, etc. During the drilling operation, the drilling system may operate in the rotary mode, in which the drill string is rotated from the surface either by the rotary table or a motor in the traveling block (i.e., the topdrive). The drilling system may also operate in a sliding mode, in which the drill string is not rotated from the surface but is driven by the downhole motor rotating the bit downhole. Drilling mud is pumped from the surface through the drill string to the drill bit, being injected into the annulus between the drill string and the wall of the well. The drilling mud carries the cuttings up from the well to the surface.

Non-magnetic drill collar 8 has a package of instruments 9 for measuring inclination, azimuth, well trajectory, etc. Also included in the drill collar 8 or other locations in the drill string are LWD instruments 10 such as a neutron-porosity measurement tool and a density measurement tool, which are used to determined formation properties such as porosity and density. The instruments are electrically or wirelessly coupled together, powered by a battery pack or a power generator driven by the drilling mud. All information gathered is transmitted to the surface via a mud pulse telemetry system or through electromagnetic transmission.

The measurement sub 7 is disposed between the downhole motor and drill bit, measuring formation resistivity, gamma ray, and the well trajectory. The data is transmitted through the cable embedded in the downhole motor to MWD or other communication devices. The downhole motor is connected to a bent housing that is adjustable at the surface from 1° to 3°, preferably up to 4°. Due to the slight bend in the bent housing, the drill bit can drill a curved trajectory.

Figure 2:
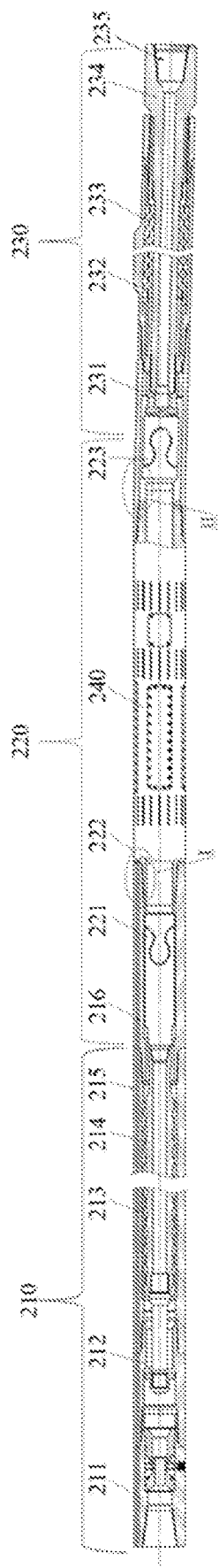
FIG. 2 shows a drilling tool of the current disclosure.

FIG. 2 shows an embodiment of a BHA of the current invention. It includes a downhole motor 210, a universal joint (i.e., u-joint) assembly 220, a measurement sub 240 that fits over the u-joint connecting rod 222, and a drive shaft assembly 230. The universal joint assembly 220 contains an upper u-joint 221 proximal to the downhole motor 210, a lower u-joint 223 distal from the downhole motor 210, and the u-joint connecting rod 222 connecting the upper and lower u-joints. The drive shaft assembly 230 has a tubular drive shaft 234 having a proximal end coupled to the bent housing 231 and a distal end which is a bit box 235 adapted to hold the drill bit (not shown). A thrust bearing 233 is disposed between the drive shaft 234 and the bearing housing 232.

The drilling mud is pumped through the downhole motor 210, generating rotational movement of the rotor 214, which is translated through the u-joint assembly 240 to the drive shaft assembly 230. The drill bit (not shown) installed in the drill box 235 in the shaft assembly 230 is driven to rotate accordingly. The shaft assembly 230 also bears the axial and radial thrusts generated by drilling. The measurement sub 240 fits over the u-joint connecting rod 222 like a sleeve. The measurement sub 240 rotates together with the drilling assembly and, at the same time, measures formation information and wellbore trajectory, etc.

The downhole motor can be a positive displacement motor (PDM), a Moineau motor, a turbine, or other suitable motors known in the art. As shown in FIG. 2, the downhole motor has a dump valve assembly 211 and an anti-drop assembly 212. The dump valve assembly 211 has an open position or a closed position. When the downhole motor is being tripped up, the bypass valve is open so that the mud can be drained into the annulus in the borehole. Furthermore, when the drilling mud flow rate and pressure reach a pre-determined value, the bypass valve closes so that the drilling mud flows through the downhole motor. The anti-drop assembly 212 is also called safety-catch assembly, which can be used to remove the downhole motor from the well when there is a motor connection failure. The anti-drop assembly may cause the mud pressure to quickly rise, alerting the surface about the connection failure when it occurs.

Referring again to FIG. 2, the measurement sub 240 is disposed about the u-joint connecting rod 222 between the upper u-joint 221 and the lower u-joint 223. In this embodiment, the measurement sub 240 is tubular in shape with a hollow center in its longitudinal direction. The u-joint connecting rod 222 extends through the hollow center of the measurement sub 240. The upper u-joint 221 (on the proximal end of the u-joint connecting rod 222) is coupled to the distal end of the rotor 214 while the lower u-joint 223 (on the distal end of the u-joint shaft 222) is coupled to the proximal end of the drive shaft 234. The stator adaptor 216 serves as a transition piece to couple together the measurement sub 240 and the downhole motor 210. The upper proximal end of the stator adaptor 216 is coupled to the stator 213 of the downhole motor 210 while its distal end is connected to the upper threadable connection of the measurement sub 240. The lower threadable connection of the measurement sub 240 is connected to the bent housing 231. The length of the measurement sub 240 may vary according to the instruments it accommodates. The length of the u-joint connecting rod 222 and the length of the stator adaptor 216 vary according to the length of the measurement sub 240, and vice versa.

Figures 2A, 2B:
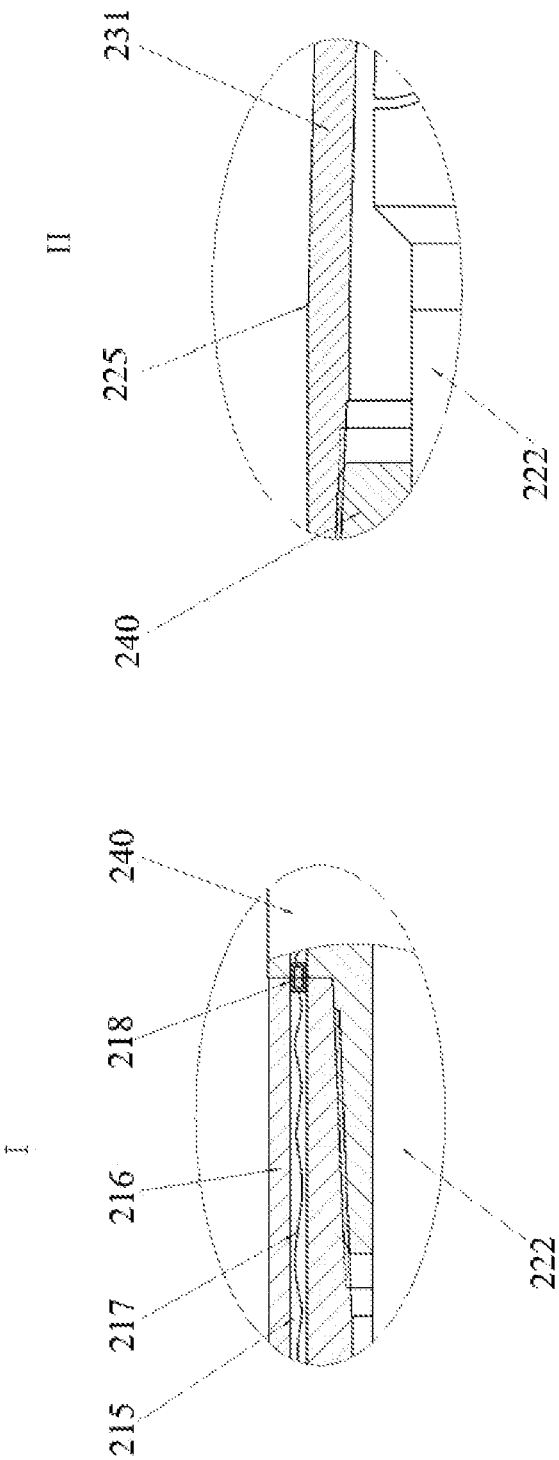
FIG. 2(a) shows the connection between the stator adaptor and measurement sub in the drilling tool.
FIG. 2(b) shows the connection between the measurement sub and the bent housing in the drilling tool.

FIG. 2(b) shows the details of the connection between the measurement sub 240 and the bent housing 231. The bent housing 231 serves as a transition piece that couples together the measurement sub 240 and the bearing housing 232. A bend 225 is built into the bent housing 231. The degree of the bend is adjustable up to 4°. The bearing housing 232 has one or more stabilizer blades built on the housing. The degree of the bend 225, the distance between the bend 225 and the drill bit (not shown), the number and location of the stabilizer blades, etc., determine the build/drop rate and the strength of the drilling tool. In the embodiment of FIG. 2, since the measurement sub 240 is installed above the bend 225, it does not affect the build/drop rate or the strength of the tool.

In another embodiment of the current disclosure, the proximal end of the measurement sub is threadably connected to the distal end of the stator in the downhole motor, eliminating the stator connector. In this embodiment, the length of the u-joint connecting rod can be reduced without affecting the length of the measurement sub. Conversely, when the length of the u-joint connecting rod stays the same, the length of the measurement sub can be increased to accommodate more instruments.

Data gathered by the measurement sub are sent to the MWD tools located above the downhole motor and transmitted to the surface from there. The measurement sub integrates modules for detecting gamma ray, resistivity, and formation density. The measurements are directional or azimuthal so that data better reflects properties of formation near the borehole sections by sections. Since the azimuthal measurement of the borehole is usually obtained using fluxgate magnetometers, the measurement is subject to interference from the electromagnetic field surrounding the tool.

The measurement sub can be powered by a battery pack installed in the measurement sub itself or at a location above the downhole motor, or by power generated in a turbine generator driven by the drilling mud. Accordingly, there are channels for data communications and/or power transmission between the measurement sub and instruments above the downhole motor.

In the embodiment of FIG. 2, the power for the measurement sub 240 is supplied by instruments above the downhole motor 210. The stator of the downhole motor 213 has one or more conduits 215 for housing electrical wires/data cables, connecting the measurement sub 240 and instruments (MWD tools, not shown) above the downhole motor 210. The conduit 215 can be a channel machined into the surface of the stator 213 or built in the elastomer layer inside the stator 213. The data cable allows stable and fast data transmissions.

FIG. 2(a) shows details around the threadable connection between the stator adaptor 216 and the measurement sub 240, including the conduit 215 inside the wall of the stator adaptor 216. In this embodiment, the section of cable (not shown) in the measurement sub 240 and the section of cable 217 in the stator adaptor 216 are connected to their respective connectors (collectively, 218). Once the stator adaptor 216 and the measurement sub 240 are threaded together, the connectors 218 are coupled together. The connectors can be pin connectors, slip ring connectors, or the other known connectors for the electrical wiring. In a further embodiment, the cable in the measurement sub 240 can be wound along the thread root of the stator connector 216 into the conduit 215. These different cable connections are applicable to all threaded connections in the drilling tools.

In still another embodiment, the measurement sub is powered by a battery pack installed therein. The measurement sub also has a wireless communication module, which communicates with a corresponding module installed above the downhole motor, establishing data communications between the two modules by electromagnetic signals.

Figure 3:
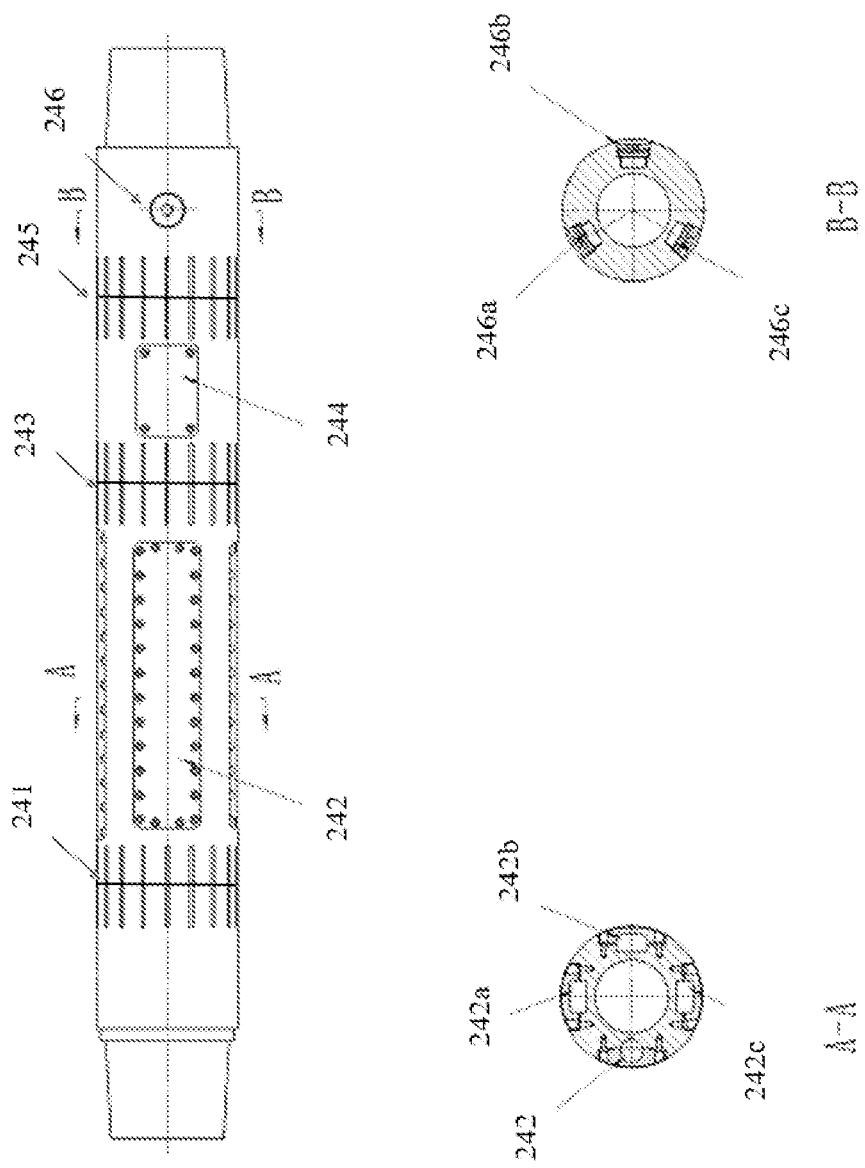
FIG. 3 is a schematic diagram of a measurement sub of the current disclosure.

FIG. 3 shows the structure of the measurement sub 240. The measurement sub 240 contains sensors and circuitries for measuring resistivity, gamma ray, and wellbore inclination. Other measurement modules can be installed when the space permits.

In this embodiment, resistivity measurement is obtained by induction logging, having a transmitter coil 241 for emitting magnetic signals located near the proximal end of the measurement sub 240, while a first receiver coil 243 and a second receiver coil 245 are installed near the distal end of the measurement sub 240. The transmitter 241 and receivers 243 and 245 are shaped as annular rings disposed around the measurement sub 240. They are sealed under a cover from the drilling mud by an insulation material (e.g., rubber). The cover has a plurality of slits that allow the transmission of electromagnetic signals. The groups of horizontal lines on the surface of the measurement sub represent the slits on the cover.

In a further embodiment, the axis of the transmitter 241 and the receivers 243, 254 in the longitudinal direction coincide with the axis of the measurement sub 240. An accelerometer 244 is installed between the receivers 243 and 245, which measures the angle between the bit and the vertical direction to construct the wellbore trajectory. Three ultrasonic sensors 246a, 246b, and 246c are spaced around the circumference of the collar below the second receiver 245 to measure the borehole caliper, as shown in the cross-sectional view B-B.

Figure 2C:
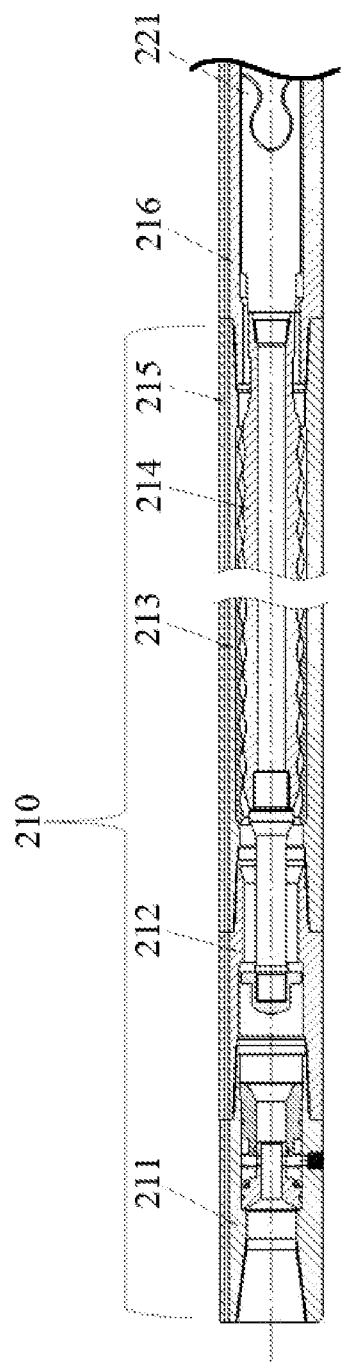
FIG. 2(c) shows the details of the upper portion of the drilling tool.
Figure 2D:
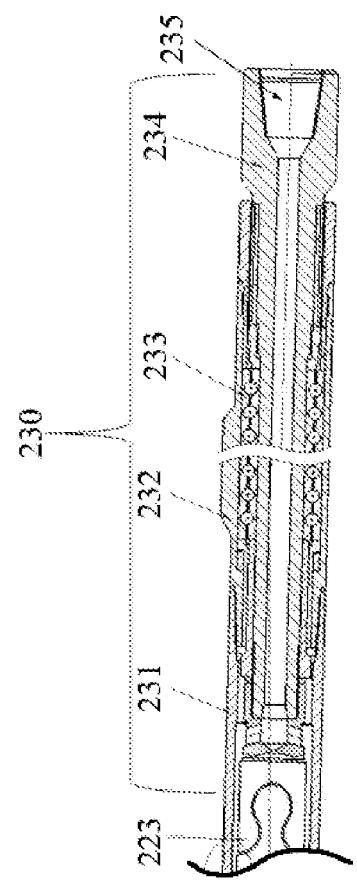
FIG. 2(d) shows the details of the lower portion of the drilling tool.

FIG. 2(c) shows the details of the upper portion of the drilling tool while FIG. 2(d) shows the details of the lower portion of the drilling tool in FIG. 2. A same part is labeled using a same reference numerals in all drawings.

Referring again to FIG. 3, the gamma ray measurement module 242 is surface-mounted in a rectangular pocket recess between the transmitter 241 and the first receiver 243. The cross sectional view A-A in FIG. 3 further shows a total of four pocket recesses spaced around the circumference of the measurement sub 240 to accommodate circuitries/modules for resistivity, inclination, borehole caliper measurements, and/or data communication (e.g., 242a, 242b, and 242c) in addition to the gamma ray measurement module 242. The battery pack can also be installed in one of these pockets. The transmitter 241 and receivers 243 and 245 are connected with the resistivity module by hardwiring. Other sensors are wired together with their respective circuitry/module. The data communication module establishes two-way communications with instruments above the downhole motor 210.

The resistivity measurement module drives the transmitter 241 to emit electromagnetic waves at one or more predetermined frequencies. The electromagnetic waves travels through the formation and are received by the two receivers 243, 245. The signals received in 243 and 245, after being processed in the resistivity module, show the phase shifts and/or differences in amplitude, which is further translated into resistivity based on phase shift and/or amplitude attenuation.

Gamma ray measurement module 242 rotates with the measurement sub 240, providing azimuthal gamma ray readings of the natural gamma radiation from the formation, thus providing azimuth gamma measurements. The resistivity data and gamma readings can be used to locate a lithologic or pre-fluid boundary relative to the borehole, therefore guiding the steering of the drill bit. Furthermore, the accelerometer 244 monitors wellbore inclinations and the ultrasonic probes 246 a-c monitor borehole caliper. Because the measurement sub 240 is close to the drill bit, the measurement data better represents the work environment near the drill bit in real time, allowing real-time monitoring and steering of the drill bit.

In still other embodiments, the induction logging tool has more than one transmitter. The transmitters can be installed on both sides of the receivers. Such arrangements allow measurements of resistivity at different depths into the formation perpendicular to the borehole. Furthermore, the axis of the transmitters or receivers can be arranged at an angle to the axis of the measurement sub, which allows azimuthal measurement of the resistivity at different locations around the borehole.

Figure 4:
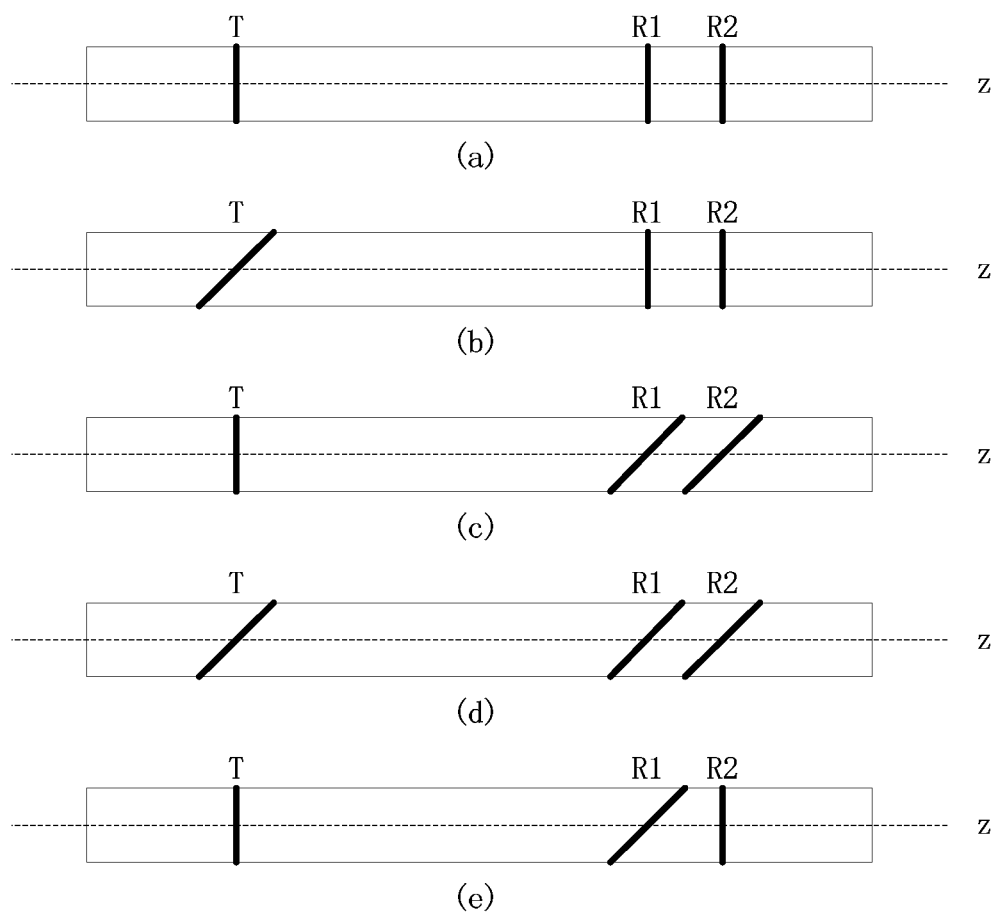
FIG. 4 shows several embodiments for a resistivity logging tool of the current disclosure.

FIG. 4 shows alternative arrangements of the transmitters and receivers. FIG. 4(a) shows the transmitter T and receivers R1 and R2 are arranged coaxial with the measurement sub. The embodiment in FIG. 4(b) has the transmitter T arranged at an angle to the axis of the measurement sub. In contrast, the embodiment in FIG. 4(c) has the receivers R1 and R2 at an angle to the axis of the measurement sub. FIG. 4(d) shows all of the T, R1, and R2 are at an angle to the axial direction of the measurement sub. Finally, the embodiment in FIG. 4(e) has one of the receivers, R1, at an angle to the axial direction of the measurement sub. The asymmetrical arrangement of the transmitter T and receivers R1 and R2 in FIGS. 4(b)-4(e) allows measurements of azimuthal resistivity.

Figure 5:
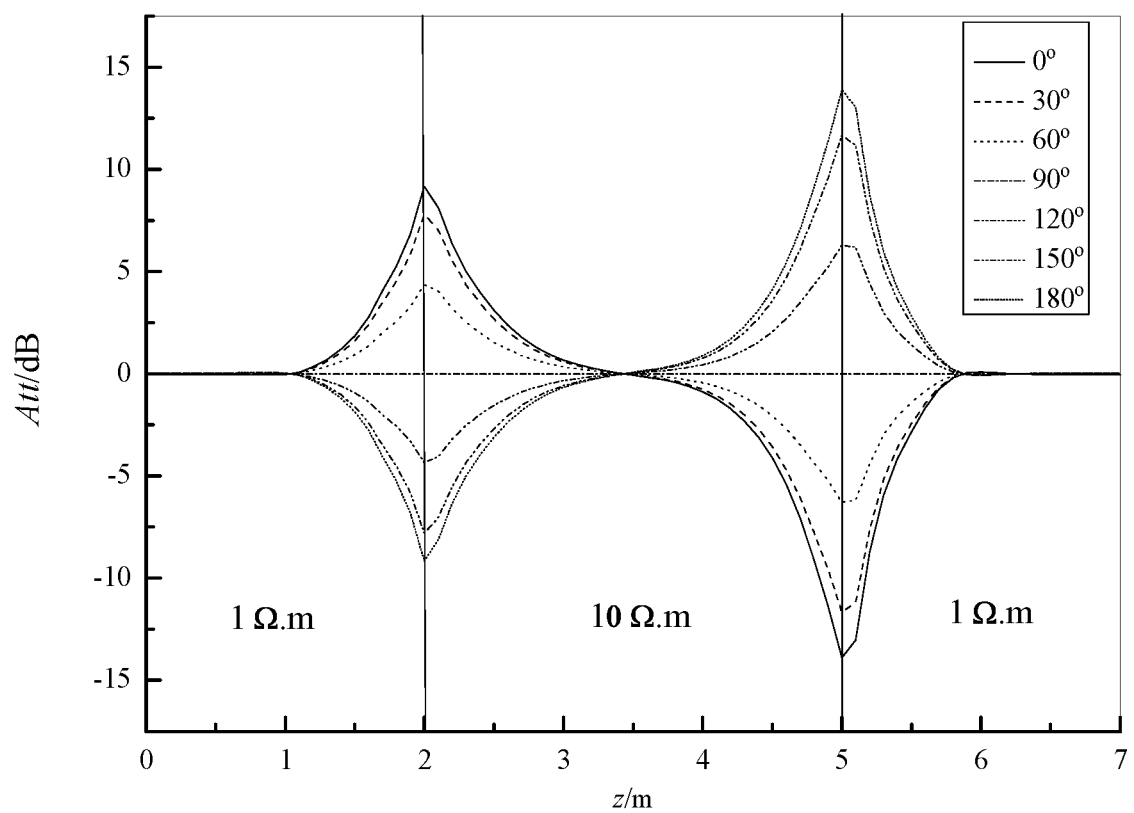
FIG. 5 shows simulated induction responses using a resistivity logging tool of the current disclosure.

Furthermore, by comparing the amplitude ratio and the phase shift when the azimuth angle differs by 180°, one can obtain signals identifying the formation boundary. FIG. 5 shows simulated induction responses using a combination of one axial transmitter and two tilted receivers, assuming wellbore inclination of 85° and three layers of formations. The formation resistivity are 1 ohm·m, 10 ohm·m, and 1 ohm·m, respectively. The peaks and valleys at different tool face directions (i.e., 0° to 180°) clearly show the formation boundaries at 2 m and 5 m. Alternatively, the two receivers can be arranged coaxially to the axis of the measurement sub, while titled or horizontally oriented antenna can be installed to measure signals for boundary determination.

In further embodiments, in order to improve the resolution of gamma ray measurement, the gamma ray detector can use a shield made of W—Ni—Fe, Pb, or other metals, leaving only a 45° detection window on the surface of the measurement sub. Furthermore, multiple gamma ray detectors may be installed on the measurement sub to improve the efficiency and facilitate gamma ray imaging.

The accelerometer and the ultrasonic probes may be installed on locations on the measurement sub other than shown in FIG. 2. Also, one ultrasonic probe can be used to collect azimuthal data to calculate an average borehole caliper. Still, instead of induction logging tools (e.g., transmitters, receivers, and associated circuitry) when using a low conductivity drilling mud, laterolog tools are employed when using a salt mud. Finally, instead of wired connections between the measurement sub and the MWD tools above, electromagnetic transmitters/receivers can be used to establish wireless communications.

In another embodiment of the current disclosure, methods and apparatus for measuring and correcting formation resistance are disclosed. The apparent formation resistivity $R_a$ is affected by temperature, borehole size, bed thickness, invasion effects, mud resistivity, etc. For example, the deeper the well is, the higher the downhole temperature is, and the noise of the electronics increases accordingly. Also, when formation changes, the borehole can be irregular. In the state of art resistivity logging, multiple transmitter coils are installed on both sides of the receiver coils to compensate for the irregularities. However, such designs increases the length of the logging tool and makes the logging tool susceptible to bending and to other damages in a high inclination well or a sharp radius well. The one transmitter—two receivers configuration would avoid such problems but cannot compensate for the borehole effects and the temperature effects.

The following algorithm is designed to correct the apparent resistivity for temperature and borehole effects to obtain true formation resistivity. When the electromagnetic waves are sent from the transmitter $T_1$, which generates at the receiver $R_1$ a first signal that has a phase $P_{11}$ and an amplitude $A_{11}$ and at the receiver $R_2$ a second signal that has a phase $P_{12}$ and an amplitude $A_{12}$. Theoretical values of the phase shift and the amplitude ratio are not affected by the temperature and can be expressed as follows:

$$PD = P_{11} - P_{12}, \; AT = 20\log_{10}\left(\frac{A_{11}}{A_{12}}\right) \qquad (1)$$

In practice, the phase shift and the amplitude ratio are also functions of downhole temperature T.

$$PD(T) = PD + E_{PD}(T) \qquad (2)$$

$$AT(T) = AT + E_{AT}(T) \qquad (3)$$

wherein $E_{PD}(T)$ and $E_{AT}(T)$ are deviations from the theoretical values, expressed below:

$$E_{PD}(T) = PD(T_0) + K_{PD1} \times (T-T_0) + K_{PD2} \times (T-T_0)^2 + K_{PD3} \times (T-T_0)^3 \qquad (4)$$

$$E_{AT}(T) = AT(T_0) + K_{AT1} \times (T-T_0) + K_{AT2} \times (T-T_0)^2 + K_{AT3} \times (T-T_0)^3 \qquad (5)$$

$PD(T_0)$ and $AT(T_0)$ are the differences between the theoretical value and the value obtained in the air at an initial temperature $T_0$. T is the downhole temperature. $K_{PDi}$ and $K_{ATi}$ are coefficients.

To account for the temperature effect on the resistivity, the instrument is first calibrated at temperature $T_0$ in the air to obtain the phase shift and the amplitude ratio. These values are compared with theoretical values to obtain $PD(T_0)$ and $AT(T_0)$.

Subsequently, the phase shift and the amplitude ratio values at a plurality of temperature points ($T_i$, i=1 to n) in the air are measured.

phase shift values: $PD(T_1)$, $PD(T_2)$, . . . , $PD(T_n)$ amplitude ratio values: $AT(T_1)$, $AT(T_2)$ . . . , $AT(T_n)$ The deviations from theoretical values (i.e., PD and AT) are calculated according to the following equations.

$$E_{PD}(T_i)=PD(T_i)-PD$$

$$E_{AT}(T_i)=AT(T_i)-AT$$

The deviations are fitted to equations (4) or (5) using linear regression or exponential regression to obtain the coefficients $K_{PD\_1}$, $K_{PD\_2}$, $K_{PD3}$, $K_{AT\_1}$, $K_{AT\_2}$, and $K_{AT3}$. Thereafter, PD(T) and AT(T), adjusted for temperature effect, are calculated according to equations (2) or (3). The apparent resistivity $R_a$, adjusted for temperature, can be obtained based on PD(T) and/or AT(T).

To account for errors caused by borehole caliper variation, real time caliper values obtained by ultrasonic probes are combined with the borehole calibration curves. Furthermore, the mud resistivity downhole is calculated based on the mud resistivity measured at the surface and further adjusted for, e.g., the temperature difference. Accordingly, the amplitude attenuation resistivity $R_{amp}$ and the phase shift resistivity $R_{pha}$ are functions of downhole mud resistivity $R_{mud}$, borehole caliper d, and amplitude ratio or the phase shift.

$$R_{amp}=f(R_{mud},d,\text{amp})$$

$$R_{pha}=f(R_{mud},d,\text{pha})$$

In one embodiment, the database for $R_{amp}$ and $R_{pha}$ according to different combinations of downhole resistivity, caliper d, and amplitude ratio and/or phase shift are loaded into a machine readable memory in the circuitry on the measurement sub. During drilling operations, after obtaining the values of the amplitude ratio, phase shift, borehole caliper and mud resistivity, the corrected $R_{amp}$ and $R_{pha}$ can be quickly calculated and transmitted to the surface.

Figure 6A:
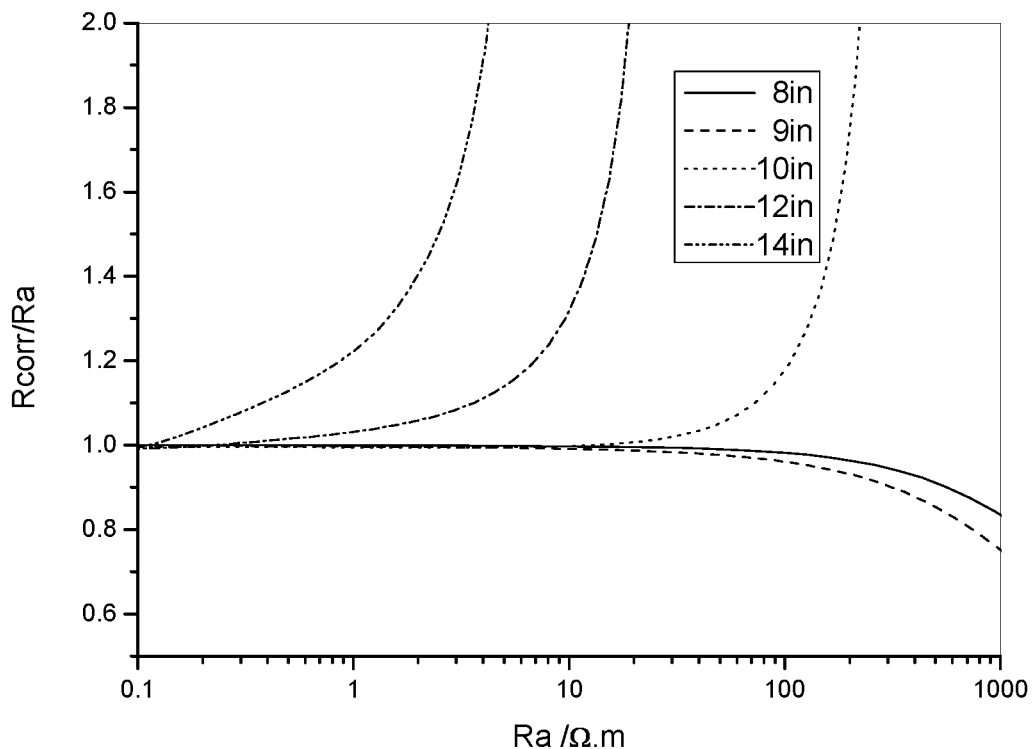
FIG. 6(a) is a calibration chart for borehole amplitude resistivity adjustment.
Figure 6B:
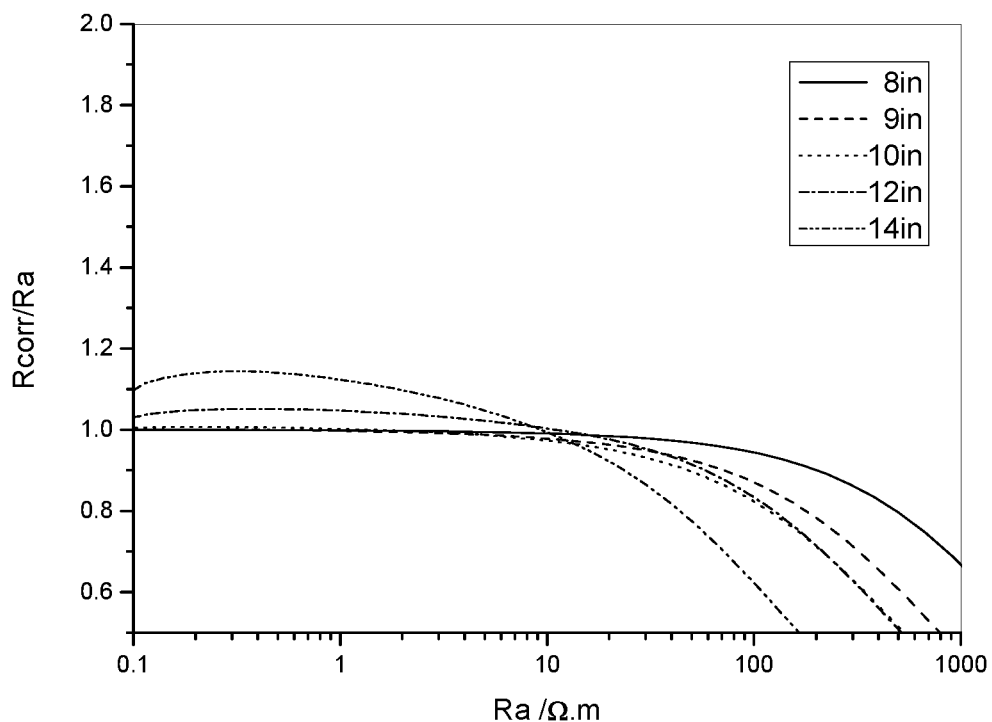
FIG. 6(b) is a calibration chart for borehole phase shift resistivity adjustment.

FIG. 6 demonstrates a specific case in the above-described embodiment, which corrects for the borehole effect. FIG. 6(a) is a chart containing amplitude attenuation resistivity calibration curves at various borehole calipers from 8 inches to 14 inches. Likewise, FIG. 6(b) is a chart of phase shift resistivity calibration curves at borehole calipers from 8 inches to 14 inches. The mud resistivity $R_{mud}$ in both cases is 0.05 ohm·m. Once apparent resistivity $R_a$ and the borehole caliper are available, the corrected resistivity $R_{corr}$ can be quickly obtained from chart. In this embodiment, the apparent resistivity $R_a$ may be before or after adjustments for other factor, such as the temperature effect as shown in equations (2) or (3).

Figure 7:
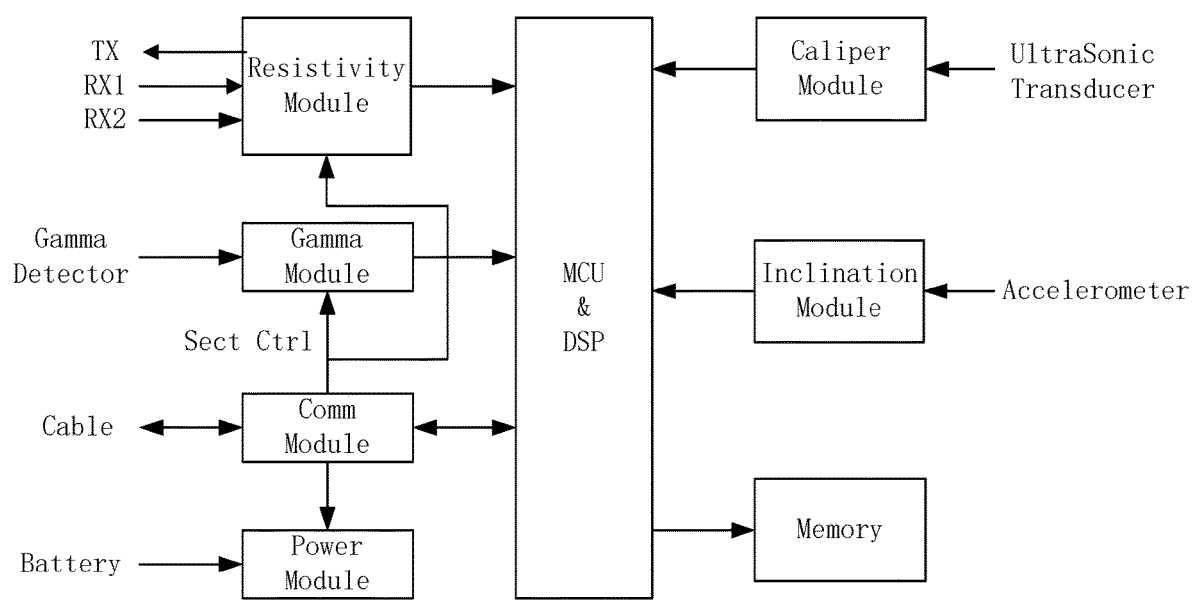
FIG. 7 is a block diagram showing various functional modules in the measurement sub.

FIG. 7 is a block diagram showing the relationships among various measurement modules. The resistivity module, the gamma ray detection module ("Gamma Module"), the communication module ("Comm Module"), the power module, the borehole caliper module ("Caliper Module"), the wellbore inclination module ("Inclination Module") represent circuitries, which are coupled to their respective instrument or sensors. All these modules are coupled directly or indirectly with the MCU (microcontroller) and DSP (digital signal processor) chips onboard. In the MCU/DSP module, the MCU chip operates as a system controller (e.g., communication control) while the DSP chip carries out intensive data processing to calculate various parameters (e.g., resistivity, inclination, caliper, and gamma ray reading). Alternatively, the MCU/DSP chips can be packaged together physically while their functions may also overlap, e.g., incorporating DSP functionalities into MCU, and vice versa.

The power module contains a multichannel DC-DC converter, which receives power for the battery pack or other sources and provides a plurality of power outputs that match the power/voltage specification of various modules. When the power is generated by a turbine or supplied by a battery pack above the downhole motor through a power cable to the measurement sub. In another embodiment, the power can be carried together with data signals to the communication module, which then separates the power from the data signals. The data can be stored in the memory onboard the measurement sub or can be transmitted through the communication cable to the MWD instruments above the downhole motor and further being forwarded to the surface. The data can also be transmitted wirelessly by the transmission device from the measurement sub to the MWD instruments.

For resistivity logging, DSP generates a preset timing sequence. The resistivity module, acting according to a control command from MCU & DSP, generates electromagnetic signals at 400 kHz and 2 MHz, which, after amplification, are sent to the formation through the transmitter. The signals, after traveling through the formation, are received by the two receivers. After further amplification, mixing, and filtering, the received signals are sent to the MCU/DSP module for calculation of the amplitude attenuation resistivity and the phase shift resistivity, which are further combined with azimuthal control signals to give azimuthal resistivity information.

The gamma ray detector may be a Geiger-Mueller tube or a detector that uses solid state scintillation crystals. In the latter case, the gamma ray absorbed by the crystal produces light flashes, which are captured by a photomultiplier and translated into electrical pulses. The electrical pulses are sent to the MCU/DSP module. Combined with the azimuthal information, the MCU/DSP module associates the pulses to various azimuthal sections of the borehole wall.

Figure 8:
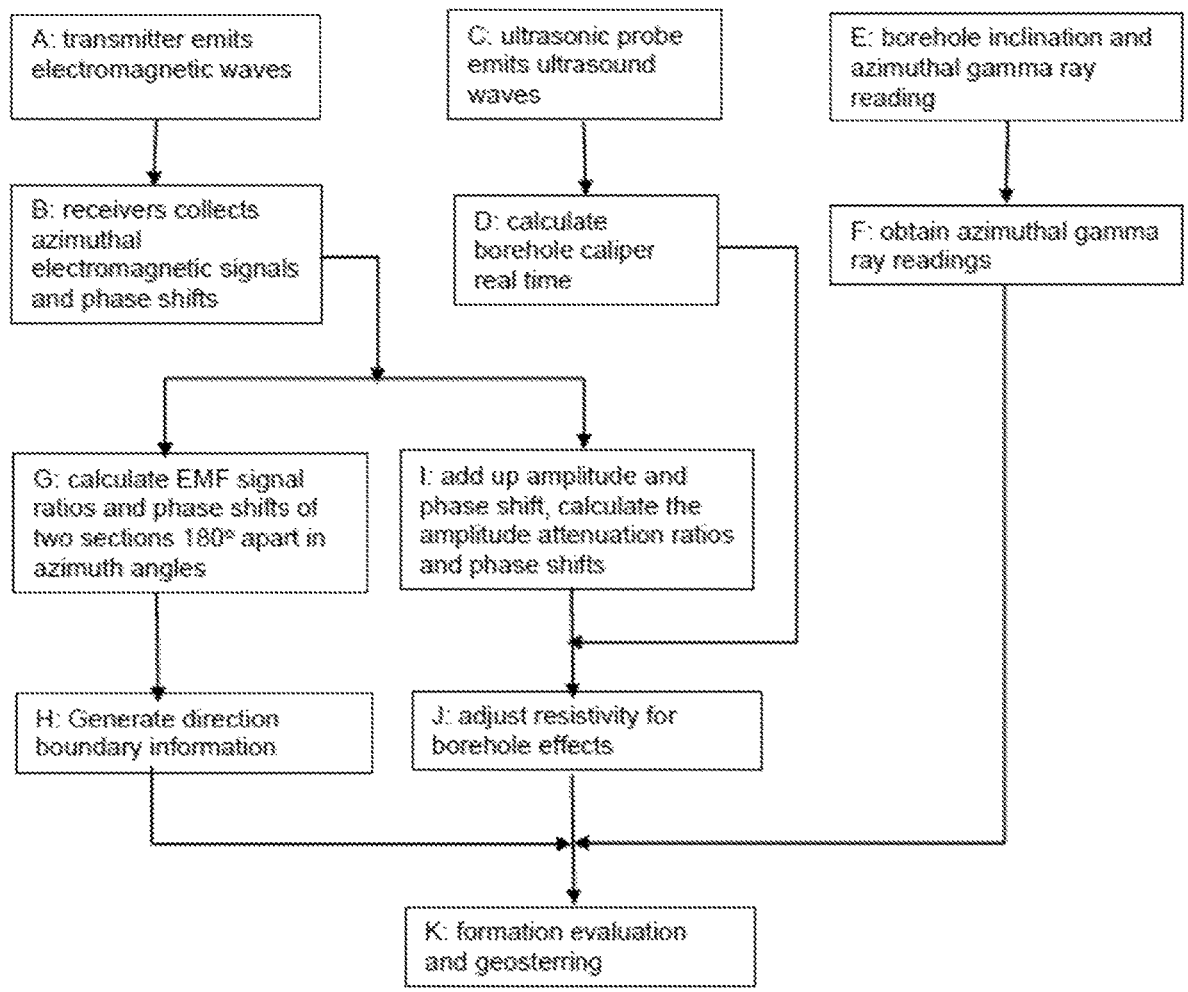
FIG. 8 is a diagram showing the workflow of the measurement sub of the current disclosure.

FIG. 8 shows an exemplary work flow of the near bit directional drilling tool of this disclosure. In Step A, under the control of DSP, the transmitter in the measurement sub regularly sends electromagnetic waves to the formation, which travel through the formation. The receivers rotate with the measurement sub, receiving electromagnetic signals along the wall of the borehole at all azimuth angles (Step B). The DSP calculates the electromagnetic fields (EMF) amplitude ratios and phase shifts from two sections that have a 180° phase difference (Step G). The results are used to calculate the formation boundary (Step H). The DSP sums up the signal amplitudes and phase shifts of different azimuthal sections and calculates the ratio of signal attenuation and phase shift between two receivers (Step I).

At the same time, the ultrasonic probe sends out ultrasound waves into the borehole (Step C) and calculates real-time borehole caliper (Step D). The real-time borehole caliper information is combined with the signal attenuation ratios and phase shifts from Step I to obtain the resistivity corrected for the borehole effect (Step J).

Furthermore, the well inclination and gamma ray detectors are used to obtain azimuthal gamma ray readings (Step E), which is further processed to obtain near-bit gamma ray imaging (Step F). Finally, the boundary information, the resistivity, and the azimuthal gamma ray reading are combined to perform formation evaluation and to guide directional drilling. The gamma imaging can be used to detect the formation boundary and its direction (Step K). Combined with near-bit directional signals, the gamma ray imaging can predict the formation boundary and its direction in the formation that has yet to be penetrated.

Information such as formation resistivity, directional signals, and azimuthal gamma rays can be synthesized to predict the distance to formation boundary, the direction of the formation boundary, the relative inclination, etc. Furthermore, comparing with conventional logging tools, which are installed more than 10 meters away from the bit, the measurement sub is installed only a few meters above the bit and collects near-bit or at-bit information. Such real time information enables more effective directional drilling.

In an alternative embodiment of this disclosure, the measurement sub can be installed in a rotary steerable system (RSS). For example, an articulated cylindrical steering sleeve can replace the stator connector in the drilling tool shown in FIG. 2. Drilling mud actuated pistons are used to push against the steering sleeve. The steering sleeve in turn pivot the u-joint to the desired direction.

While preferred embodiments of this disclosure have been shown and described, modifications can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims. The scope of the claims shall include all equivalents of the subject matter of the claims.

What is claimed is:

1. A method for obtaining formation resistivity, comprising:
    deploying a downhole drilling tool into the wellbore, wherein the downhole drilling tool comprises:
    a downhole motor comprising a rotor and a stator;
    a universal-joint assembly comprising an upper universal joint and a lower universal joint and a connecting rod connecting the upper universal joint and the lower universal joint;
    a drive shaft assembly comprising a drive shaft;
    a drill bit coupled to a distal end of the drive shaft; and
    a measurement sub,
    wherein a distal end of the downhole motor is coupled to the upper universal-joint, the drive shaft assembly is coupled to the lower universal-joint, and
    wherein the connecting rod extends through the measurement sub in a longitudinal direction of the measurement sub, and
    wherein the stator in the downhole motor comprises a conduit built in the elastomer liner that receives an electric wire or a data cable, and
    wherein the measurement sub comprises:
    a resistivity measurement tool for measuring a formation resistivity, the resistivity measurement tool having a transmitter, a first receiver, and a second receiver; at least one gamma ray detectors disposed on a surface of the measurement sub; at least one accelerometer for measuring an inclination of the wellbore; at least one ultrasonic probe for measuring a caliper of the wellbore; and a communication module for transmitting data through wired connection or wirelessly;
    rotating the measurement sub with the downhole drilling tool;
    emitting electromagnetic waves at two or more frequencies using the transmitter in the resistivity measurement tool;
    receiving azimuthal electromagnetic signals at the first receiver and the second receiver in the resistivity measurement tool;
    calculating a formation boundary information based on measured amplitude ratios and measured phase shifts between electromagnetic fields from two azimuthal sections having a 180° phase difference;
    obtaining an apparent resistivity based on the measured amplitude ratios, the measured phase shifts, or both the measured amplitude ratios and the measured phase shifts between electromagnetic signals received by the first receiver and by the second receiver in the resistivity measurement tool;
    adjusting the apparent resistivity for a downhole temperature effect; and
    adjusting the apparent resistivity for a borehole caliper effect.

2. The method of claim 1, wherein the step of adjusting the apparent resistivity for the downhole temperature effect comprises:
    calibrating the resistivity measurement tool in the air at a plurality of temperatures (Ti, i=0 to n) to obtain phase shift values ($PD_{Ti}$) and amplitude ratio values ($AT_{Ti}$) corresponding to the plurality of temperatures;
    calculating deviations $E_{PD}(Ti)$, which are differences between PDT and a corresponding theoretical value PD;
    calculating deviations $E_{AT}(Ti)$, which are differences between $AT_{Ti}$ and a corresponding theoretical value AT;
    obtaining algorithms for $E_{PD}(T)$ and $E_{AT}(T)$ using linear regression based on values of $E_{PD}(Ti)$ and $E_{AT}(Ti)$, wherein T is a downhole temperature; and
    obtaining $PD(T)=PD+E_{PD}(T)$ and $AT(T)=AT+E_{AT}(T)$, wherein PD(T) is the phase shift value at downhole temperature T and AT(T) is the amplitude ratio at temperature T.

3. The method of claim 2, wherein the step of adjust the apparent resistivity for the borehole caliper effect comprising:
    compiling a database comprising an amplitude attenuation resistivity $R_{amp}$ and a phase shift resistivity $R_{pha}$, wherein $R_{amp}$ and $R_{pha}$ are adjusted for downhole mud resistivity $R_{mud}$, borehole caliper d, and downhole temperature T;
    obtaining a borehole caliper value measured real time using the at least one ultrasonic probes; and
    obtaining $R_{amp}$ and $R_{pha}$ at the borehole caliper value.

* * * * *